United States Patent
Fitzgerald et al.

(10) Patent No.: US 6,594,903 B2
(45) Date of Patent: Jul. 22, 2003

(54) APPARATUS AND METHOD FOR MAKING A SHAPED-SPRING ASSEMBLY FOR USE IN A MAGNETIC HEAD-TO-MEDIA BACKER DEVICE

(75) Inventors: Scott M. Fitzgerald, Rochester, NY (US); Jan A. Chrisler, Rochester, NY (US); Daniel M. Pagano, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/193,347

(22) Filed: Jul. 11, 2002

(65) Prior Publication Data

US 2003/0024109 A1 Feb. 6, 2003

Related U.S. Application Data

(62) Division of application No. 09/557,464, filed on Apr. 25, 2000, now Pat. No. 6,470,572.

(51) Int. Cl.[7] .................................................. B23P 13/00
(52) U.S. Cl. ........................... 29/896.9; 72/418; 72/428
(58) Field of Search ........................... 29/896.9, 896.93; 72/380, 386, 418–420, 424, 428

(56) References Cited

U.S. PATENT DOCUMENTS

| | | | |
|---|---|---|---|
| 4,395,900 A | * 8/1983 | Saurenman | 72/428 |
| 4,839,953 A | * 6/1989 | Mizuta | 29/225 |
| 5,274,522 A | 12/1993 | Taillie | |
| 5,307,100 A | 4/1994 | Kubo | |
| 5,457,978 A | 10/1995 | Bogart et al. | |
| 5,531,008 A | 7/1996 | Chapman et al. | 29/896.9 |
| 5,576,916 A | 11/1996 | Ryan et al. | |
| 5,598,310 A | 1/1997 | Rowden et al. | |
| 6,145,198 A | * 11/2000 | Karmeli | 29/896.9 |

* cited by examiner

Primary Examiner—P. W. Echols
(74) Attorney, Agent, or Firm—David A. Novais

(57) ABSTRACT

A method and apparatus for making a shaped-spring assembly. The method and apparatus utilizes a spring forming apparatus which facilitates the forming of shaped springs without adversely effecting the characteristics of the spring, and a magazine arrangement which stores and loads shaped springs, while maintaining the shape of the springs. The magazine arrangement further permits the storage of a plurality of the shaped springs without fatiguing a leading edge of the spring. With the apparatus and method of the present invention, it is possible to load empty shaped spring cavities at a select location, such as at a field site, and also have a steady supply of shaped springs available for quick replacement. The forming apparatus is designed so as to easily cooperate and/or be mounted onto the magazine arrangement so as to facilitate the transfer of shape springs which are shaped by the forming apparatus into the magazine arrangement.

5 Claims, 3 Drawing Sheets

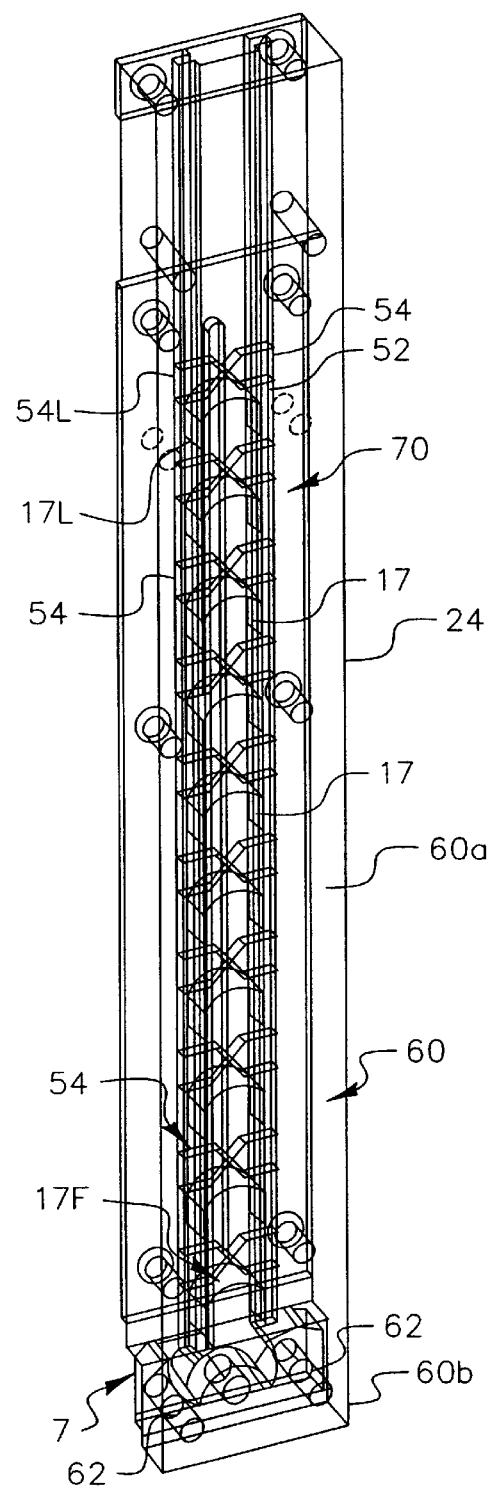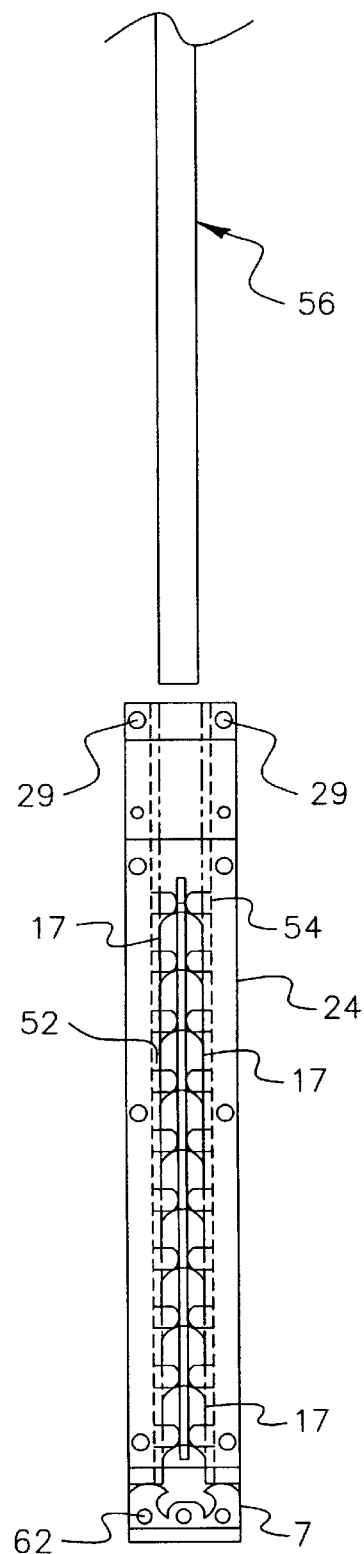
FIG. 3 (a)
FIG. 3 (b)

APPARATUS AND METHOD FOR MAKING A SHAPED-SPRING ASSEMBLY FOR USE IN A MAGNETIC HEAD-TO-MEDIA BACKER DEVICE

This is a divisional application of U.S. Pat. No. 09/557,464 Apr. 25, 2000 now U.S. Pat. No. 6,470,572.

FIELD OF THE INVENTION

The present invention relates to an apparatus and method for making a shaped-spring assembly for use in a magnetic head-to-media backer. More specifically, the present invention relates to an apparatus and method for making a shaped-spring assembly which involves the use of a shaped spring forming unit and a shaped spring storing and loading magazine.

BACKGROUND OF THE INVENTION

Shaped-spring assemblies have been used in a number of electrical and mechanical devices such as cameras, tape decks, sound recording devices, and automated materials handling machinery. These shaped-spring assemblies are commonly called bubble-spring assemblies and are employed in situations that require a constant load with the ability to accommodate large spacial displacements. A typical bubble-spring assembly provides a restraining force against a moving piece of a magnetic section of a film, so that the film is held against a recording head under constant pressure.

A bubble-spring assembly typically includes a cavity that comprises a block and the bubble spring. The cavity includes a shaped-hollow cavity formed through the block and the bubble spring is typically small and thin. Due to the size of the spring, delicate handling of the spring is required. The bubble spring is positioned within the cavity to form a convex or arched portion that extends beyond the dimension of the cavity block. In this manner, the bubble spring is placed under tension and will thereby provide a spring force against an article, such as film, that has displaced the spring into the cavity. Prior to shaping and insertion into the cavity, the bubble spring is a flat elongated piece of thin material, typically metal, and commonly referred to as a spring blank. This type of bubble spring assembly is disclosed in, for example, U.S. Pat. Nos. 5,274,522 and 5,531,008.

In a conventional APS film strip, there is a magnetic layer that provides a way to read and/or write data. The above-mentioned U.S. Pat. No. 5,274,522 as noted above, discloses a bubble spring load pad which is a film backer pad used for urging the film base to a magnetic head. This backer pad (also known as a bubble spring assembly) includes a cavity and the bubble spring. After extended use of the assembly including the bubble spring, it has been found that the spring needs to be routinely replaced. This is due to the constant urging of the bubble spring against the magnetic layer of the film. Due to cost, it is not economically feasible to replace both the cavity and the bubble spring each time the spring needs to be replaced. It is preferred to use the existing cavity and install a new spring. However, as noted above, the springs tend to be small and thin, and thus very difficult to accurately replace within a small cavity without adversely effecting the spring characteristics of the spring. Also, in reloading bubble springs within a cavity, manufactures and/or consumers may use springs from manufactures that may provide poor spring performance due to inferior material and/or manufacturing methods.

A method of replacing a spring as disclosed in the above-mentioned U.S. Pat. No. 5,531,008 is complex and has a fair amount of cost and usage difficulty associated with it. The apparatus as disclosed in U.S. Pat. No. 5,531,008 also only supplies one spring at a time. Further, the method of spring installation as disclosed in the U.S. Pat. No. 5,531,008 causes the leading half of the spring to be fatigued during spring installation by the way the leading edge of the spring gets forced into, then around, a tight radius. This causes the leading half of the spring to be fatigued. This may cause the spring load to be lower in head load after spring installation than is desired. That is, the film has what is called an anticlastic effect (edge curl) under the edge of the film on/or close to the magnetic head track signal location. Under certain situations such as lower humidity and/or core set film, a lower gram load could limit the springs ability to provide the needed force on the outside track location to provide a high enough force to obtain consistent read/write signal processing.

The loading or replacement of springs needs to be done in a manner which does not result in too large or too low of a spring force, since a large spring force would tend to damage the film or article that the spring rides against, and a low spring force would not provide enough of a force to urge the spring against, for example, a magnetic head.

SUMMARY OF THE INVENTION

The present invention provides for an improved method and apparatus for making a bubble spring (hereinafter referred to as a shaped-spring) assembly. The method and apparatus of the present invention utilizes a novel shaped-spring magazine arrangement as well as a novel spring forming unit.

The present invention provides for a mechanism which reduces or eliminates the necessity of installing undesired springs from manufactures that may use unapproved springs which can cause poor performance. This is because the present invention provides for a magazine that can be pre-loaded at a controlled location.

The present invention provides for a shaped spring magazine arrangement for making a shaped spring assembly. The shaped spring magazine arrangement comprises a base member having a first section adapted to hold a row of shaped springs and a second section adapted to hold a shaped spring cavity. A first shaped spring in the row of shaped springs is located at a first end of the first section adjacent to the second section, and a last shaped spring of the row of shaped springs is located at a second end of the first section opposite to the first end. The magazine arrangement further comprises a plurality of spacer members provided on the first section of the base member so as to be positioned between the shaped springs in the row of shaped springs; and a pusher member adapted to be inserted into the second end of the first section so as to push against the last shaped spring of the row of shaped springs, and cause the first shaped spring of the row of shaped springs to be inserted into a shaped spring cavity located at the second section.

The present invention further relates to a method of making a shaped-spring assembly. The method comprises the steps of alternatively providing shaped springs and spacer members on a first section of a base member so as to create a row of the shaped springs with the spacer members located between the shaped springs; providing a shaped spring cavity on a second section of the base member; and pushing a first shaped spring of the row of shaped springs which is furthest from the shaped-spring cavity, so as to urge a second shaped spring from the row of shape springs which is closest to the shaped spring cavity out of the first section of the base member and into the shaped spring cavity so as to form a shaped spring assembly.

The present invention further relates to a shaped spring magazine arrangement for making a shaped-spring assembly that comprises a base member having a first part adapted to hold at least one shaped spring and a second part adapted to hold a shaped spring cavity.

The present invention further relates to a method of making a shaped spring assembly which comprises the steps of positioning shaped springs in a row on a first part of a base member; placing an empty shaped-spring cavity on a second part of the base member; and loading one of the shaped springs in the row of shaped springs into the empty shaped-spring cavity.

The present invention further relates to a spring shaping tool for forming shaped springs. The spring shaping tool comprises a housing assembly having a longitudinal bore adapted to hold a mandrel therein, and a recess which extends in a direction transverse to the longitudinal bore; a spring former sized to be slidably insertable in said recess, the spring former comprising a slot which is sized to receive a spring blank and an opening extending from the slot. The spring former is slidable in the recess from at least a first position to a second position in which the opening surrounds the mandrel, such that a sliding of the spring former to the second position causes a spring blank positioned in the slot to be partially wrapped around the mandrel and extend into the opening, to thereby form a shaped spring.

The present invention further relates to a method of shaping a spring blank to form a shaped spring which comprises the steps of placing a spring blank in a slot of a spring former which is adapted to fit within a recess of a housing assembly, with the spring former having an opening which extends from the slot; and pressing the spring former having the spring blank therein in the recess of the housing assembly. The housing assembly has a longitudinal bore with a mandrel positioned therein that extends through the recess, such that the spring blank in the slot of the spring former partially wraps around the mandrel and extends into the opening, to thereby form a shaped spring.

The present invention further relates to a spring forming and loading assembly which comprises a shaping tool for shaping spring blanks to form shaped springs; and a shaped spring magazine for storing shaped springs formed by the shaping tool as a row of shaped springs, and loading the shaped springs into an empty shaped spring cavity.

The present invention further relates to a method of forming, storing and loading shaped springs to form shaped spring assemblies, which comprises the steps of (a) placing a spring blank in a slot of a spring forming member, with the spring forming member having an opening which extends from the slot; (b) pressing the spring forming member having the spring blank therein within a recess of a housing assembly, with the housing assembly having a bore with a mandrel positioned therein that extends through the recess, such that the spring blank in the slot of the spring forming member partially wraps around the mandrel and extends into the opening, to thereby form a shaped spring; (c) transferring the shaped spring to a magazine; (d) positioning the shaped spring on a first part of the magazine; (e) repeating the steps (a)–(d) until a desired number of shaped springs are formed and positioned in a row on the first part of the magazine; (f) placing an empty shaped spring cavity on a second part of the magazine; and (g) pushing one end of the row of shaped springs so as to load one of the shaped springs in the row of shaped springs into the empty shaped spring cavity.

Advantages of the method and apparatus of the present invention as described above is that it permits multiple shaped springs to be loaded one at a time by way of a storage method, and facilitates the storage of a multitude of springs for installation purposes.

Further, the method and apparatus of the present invention permits the loading of a magazine to be controlled at a select location. As an option, the magazine that is preloaded with shaped springs can be supplied to a field site for easy, correct spring installation capabilities. This allows the customer (end user) to have a steady supply of shaped springs available for quick replacement options, and permits the supply of shaped springs to be under a controlled environment by separating a spring forming function from spring storing and loading functions.

Further, a higher average installation load is realized by not fatiguing the leading edge of the spring installation.

Also, the present invention provides for a low cost and easy option for replacing springs since an end user could maintain a supply of magazines which are pre-loaded with shaped springs at a factory on site.

The method and apparatus of the present invention also facilitates field repairs by eliminating the need to send a cavity back to a manufacturer for repair.

BRIEF DESCRIPTION OF THE DRAWINGS

FIG. 3(a) is a perspective view of a shaped-spring magazine arrangement for making a shaped-spring assembly as shown in FIG. 1; and FIG. 3(b) is a top view of the shaped spring magazine arrangement illustrated in FIG. 3(a).

DETAILED DESCRIPTION OF THE INVENTION

Figure 1:
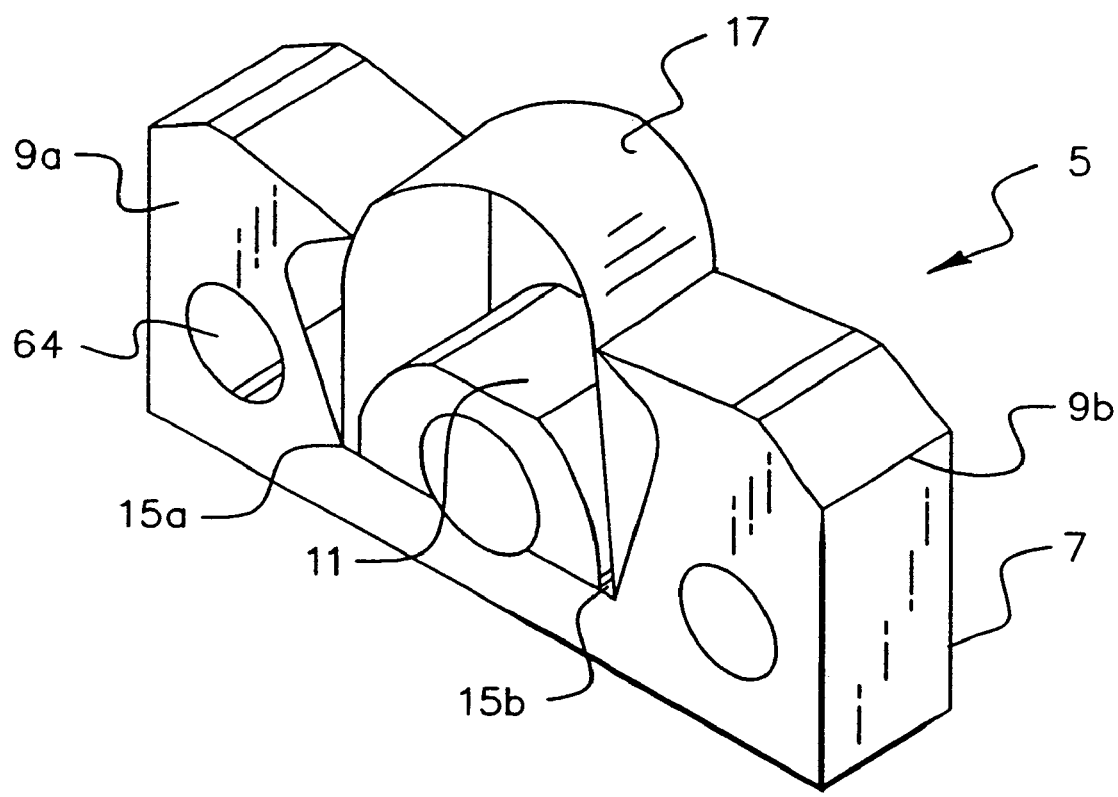
FIG. 1 is an isolated perspective view of a shaped-spring assembly made in accordance with the present invention.

Referring now to the drawings, wherein like reference numerals represent identical or corresponding parts through the several views, FIG. 1 illustrates a shaped-spring assembly 5 that is made in accordance with the apparatus and method of the present invention. As illustrated in FIG. 1, shaped-spring assembly 5 includes a shaped-spring cavity 7 which generally comprises end sections 9a, 9b and a middle flat head section 11. The combination of end section 9a and one side of flat head section 11 defines a receiving section 15a, while end section 9b and the opposite side of flat head section 11 defines a further receiving section 15b. Shaped spring assembly 5 further includes a spring blank which is curved to form a shaped spring 17. More specifically, shaped spring 17 is curved or arched so that the arched ends are held within receiving sections 15a, 15b such that spring 17 exhibits spring-like characteristics. Thus, spring 17 is placed under tension within shaped-spring cavity 7, so as to provide a spring force against an article, such as the magnetic layer of photosensitive film within a camera.

It is noted that the spring blank which forms shaped spring 17 is a delicate and fragile item. A typical spring blank has a thickness of approximately 0.0015 inches (0.0381 mm), a length of less than an inch (2.54 cm), and a width not exceeding 0.125 inches (0.317 cm). The spring blank is further commonly formed from stainless steel. In many applications, the spring blank includes a highly burnished surface that will contact super sensitive material. In an environment in which the shaped spring 17 is to contact, for example, a magnetic layer on film, it is desirable that the shaped spring not only have a predictable stress strain history resulting from the shaping process, but also retain the qualities associated with the burnished surface by avoiding even minor or hair line scratches. Thus, a precise and controlled method and apparatus are necessary so as to properly load a spring blank into shaped-spring cavity 7 to form shaped spring 17 and thereby form shaped spring assembly 5.

Figure 2:
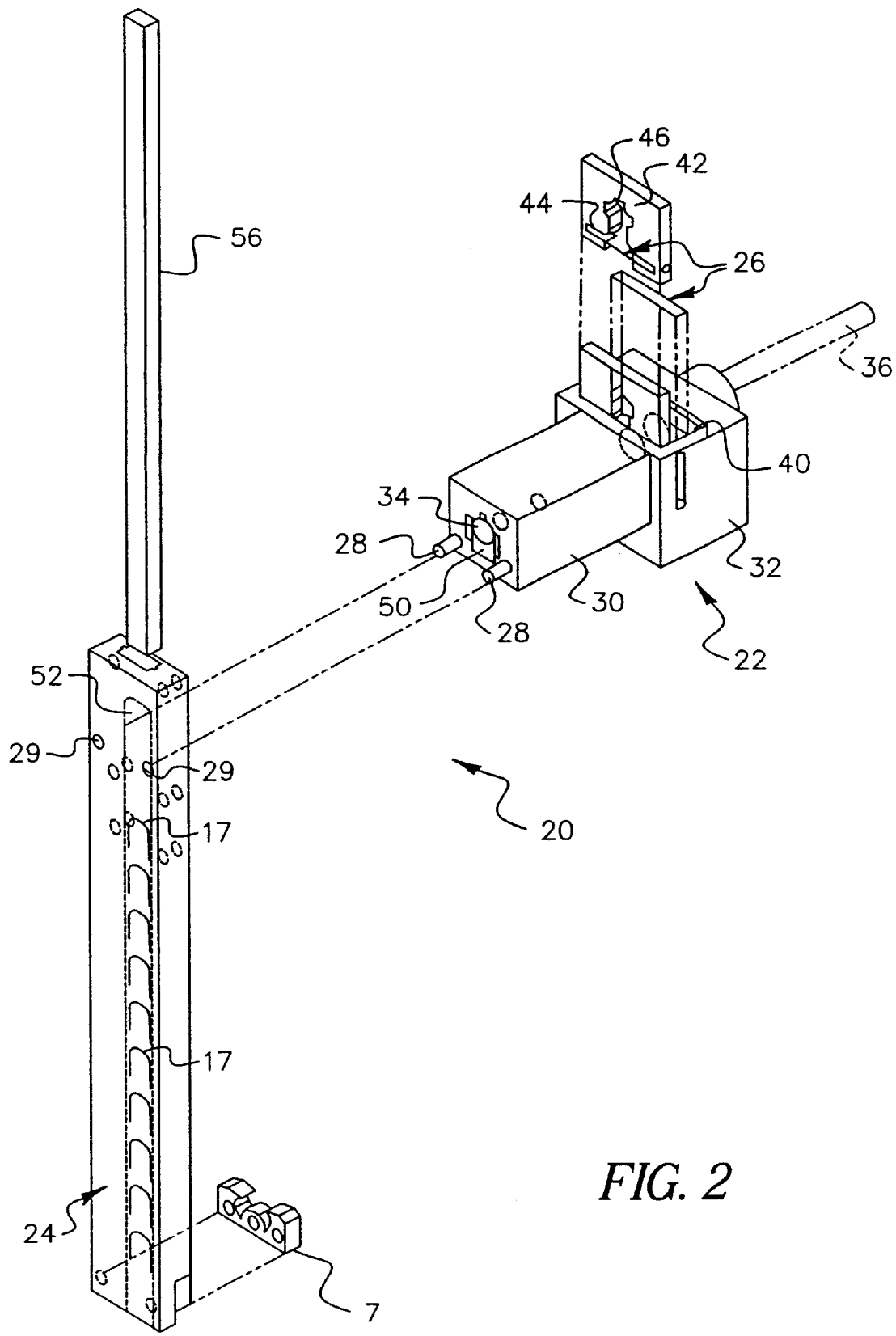
FIG. 2 is a perspective view of a shaped spring forming and loading apparatus and a shaped spring magazine arrangement in accordance with the present invention.

FIG. 2 illustrates an overall system 20 for shaping, storing and loading spring blanks 26 into an empty shaped-spring cavity 7. As shown in FIG. 2, system 20 includes a shaping tool or spring forming and loading apparatus 22, and a shaped-spring magazine arrangement 24. For loading spring blanks into shaped-spring magazine arrangement 24, spring forming and loading apparatus 22 can be connected or mounted to shaped spring magazine arrangement 24 by way of, for example, locating pins 28 which cooperate with corresponding recesses 29 on shaped-spring magazine arrangement 24 or vice versa. It is recognized that this is just one method of connecting or mounting forming and loading apparatus 22 onto magazine arrangement 24, and other methods such as screws, pins etc., can be utilized to mount forming and loading apparatus 22 onto magazine arrangement 24.

With respect to the process and apparatus for shaping spring blanks 26 in forming and loading apparatus 22, apparatus 22 includes a housing 30 and a shaper 32 adjacently positioned next to each other as two units or an integral unit to form a housing assembly. Spring forming and loading apparatus 22 further includes a mandrel 34 that extends through housing 30 and shaper 32, as well as a spring conveyer or Tube-like pusher member 36. Housing 30 further includes the aforementioned locating pins 28.

During use of forming and loading apparatus 22 for forming shaped springs 17 which are initially in the form of spring blanks 26, spring blanks 26 are first placed in a recess 40 in shaper 32. Shaper 32 further includes a spring former 42 slidably insertable in the recess 40, or in a further recess downstream (i.e., closer to housing 30) of recess 40. Spring former 42 includes a slot 44 which is opened in a first direction and extends to a substantially circular portion or opening 46 in a second direction. Substantially circular portion 46 generally matches the curvature of mandrel 34. Therefore, with system 20 of the present invention, a user would place spring former 42 in recess 40, and place a spring blank 26 into recess 40 or a recess upstream of recess 40 so that spring blank 26 is aligned with slot 44 of spring former 42. Thereafter, spring blank 26 can be slid or pushed into slot 44 by way of conveyor 36. As a further option, spring blank 26 can be first placed in slot 44 of spring former 42, with spring former 42 then being inserted in recess 40. Thereafter, spring former 42 having spring blank 26 positioned in slot 44 is further inserted or pressed in recess 40 so that spring blank 26 is bent around mandrel 34 as opening 46 extends around mandrel 34. This effectively forms shaped spring 17 around mandrel 34. Thereafter, shaped spring 17 is moved along mandrel 34 by use of conveyer 36 until shaped spring 17 exits through an opening 50 in housing 30, and enters a slot or opening 52 in magazine arrangement 24 (see FIG. 1). Spring conveyer 36 can then be moved rearwardly, and a bubble spring spacer 54 as illustrated in FIG. 3(a) or 3(b) is also placed in slot 52 of magazine arrangement 24. Thereafter, shaped spring 17 as well as spacer 54 are pushed along slot 52 by way of rod-like pusher member 56 of magazine arrangement 24, and the process is again repeated for the next shaped spring and spacer member.

Now, the details of magazine arrangement 24 will be described. As illustrated in FIGS. 3(a) and 3(b), magazine arrangement 24 includes a base 60 which has a first part or section 60a that includes slot 52 and a second part or section 60b that includes mounting pins 62. Mounting pins 62 are effective to locate bubble spring cavity 7. That is, mounting pins 62 can cooperate with recesses 64 (see FIG. 1) of cavity 7. Therefore, base member 60 of magazine arrangement 24 essentially includes first part or section 60a which is designed to receive, hold and store shaped springs 17 as well as spacer members 54, and second part or section 60b which includes the mounting pins 62 and is designed to hold a shaped spring cavity 7. First part or section 60a of base member 60 also includes slot 52 as described above, into which shaped springs 17 are inserted from forming and loading apparatus 22. Slot 52 is generally sized so as to tightly receive shaped springs 17 and maintain the shape of shaped springs 17 as shaped springs 17 are slid along slot 52 and loaded into cavity 7. FIGS. 3(a) and 3(b) illustrate magazine arrangement 24 being filled with shaped springs 17, with intervening spacer members 54 between each of the shaped springs 17 so as to facilitate the sliding of shape springs 17 along slot 52 by use of pusher member 56. As further illustrated in FIGS. 3(a) and 3(b), in loading shaped springs 17 and spacer members 54 into slot 52 of magazine 24, a row of shaped springs 17 with intervening spacer members 54 is formed.

As an option, magazine 24 can include a top cover 70 having an opening which permits one to visually observe the amount of shaped springs 17 in first section 60a of magazine 24.

With a magazine arrangement 24 as illustrated in FIGS. 3(a) and 3(b), in order to load an empty shaped-spring cavity 7 mounted on second section 60b, pusher member 56 is operated to push against one end of the row of shaped springs 17, i.e., a user will push pusher member 56 against a last spacer member 54L or shaped spring 17L in the row of shaped springs 17, so as to urge a first shaped spring 17F in the row into the empty shaped spring cavity 7. Thus, shaped spring 17F is loaded into cavity 7 while maintaining the shape of shaped spring 17F, since spring 17F will travel along slot 52 as it enters cavity 7. After spring 17F is loaded into cavity 7, shaped-spring assembly 5 as illustrated in FIG. 1 is formed. A user will thereafter remove shaped-spring assembly 5 from section 60b and continue to push pusher member 56 against the last shaped spring or spacer member (17L or 54L) to discard the spacer member 54 which follows the loaded shaped spring 17F in the row of shaped springs. This spacer member 54 can thereafter be discarded or stored for future use. A user can then place a second empty cavity 7 onto section 60b and load a further shaped spring 17 from the row of shaped springs into the second cavity 7 by utilizing pusher member 56 in the manner described above. The user can continue to load shaped springs 17 into empty shaped-spring cavities 7 until the desired amount of shaped-spring assemblies 5 are formed. Additionally, once magazine arrangement 24 is empty, a user can form and load additional shaped springs into slot 52 utilizing forming and loading apparatus 22 as described above and shown in FIG. 2.

Although the present invention illustrates manually pushing the shaped springs by using pusher member 56, the present invention is not limited thereto. It is recognized that the present invention can be automated by providing for an automatic plunger type system which can be controlled to push one shaped spring into a corresponding empty shaped-spring cavity. Also, other types of devices for pushing, sliding, pulling or moving an article, such as the shaped spring, along a slot can be utilized.

Thus, the present invention provides for a forming and loading system which facilitates the shaping of springs and further facilitates the storage and loading of springs into an empty shaped-spring cavity.

The present invention further provides for an improved forming and loading apparatus which facilitates the conversion of spring blanks into shaped springs, and can be easily mounted or interconnected to a storage magazine arrangement.

The present invention further provides for an improved storage magazine arrangement which has the capability of storing a plurality of shaped springs, and permits the easy loading of shaped springs into an empty shaped spring cavity.

With the apparatus and method of the present invention, it is possible to load empty shaped spring cavities at a controlled location, and it is also possible to convert spring blanks into shaped springs, while maintaining a predictable stress strain history resulting from the shaping process. Further, it is possible to store the shaped springs in a magazine arrangement while maintaining their shape.

The invention has been described in detail with particular reference to certain preferred embodiments thereof, but it will be understood that variations and modifications can be effected within the spirit and scope of the invention.

What is claimed is:

1. A spring shaping tool for forming shaped springs, the spring shaping tool comprising:

a housing assembly having a longitudinal bore adapted to hold a mandrel therein, and a recess which extends in a direction transverse to the longitudinal bore; and a spring former sized to be slidably insertable in said recess, said spring former comprising a slot which is sized to receive a spring blank and an opening extending from the slot, said spring former being slidable in said recess from at least a first position to a second position in which said opening surrounds the mandrel, such that a sliding of said spring former to said second position causes a spring blank positioned in said slot to be partially wrapped around said mandrel and extend into said opening, to thereby form a shaped spring.

2. A spring shaping tool according to claim 1, further comprising:

a shaped spring mover which extends into said bore, said shaped spring mover being adapted to push the shaped spring in a longitudinal direction along the mandrel.

3. A method of shaping a spring blank to form a shaped spring, the method comprising the steps of:

placing a spring blank in a slot of a spring former which is adapted to fit within a recess of a housing assembly, the spring former having an opening which extends from the slot; and pressing the spring former having the spring blank therein in the recess of the housing assembly, the housing assembly having a longitudinal bore with a mandrel positioned therein that extends through said recess, such that the spring blank in the slot of the spring former partially wraps around the mandrel and extends into said opening, to thereby form a shaped spring.

4. A method according to claim 3, comprising the further step of:

pushing the shaped spring along the mandrel to position the shaped spring for transfer to an adjacent apparatus.

5. A method of forming, storing and loading shaped springs to form shaped spring assemblies, the method comprising the steps of:

(a) placing a spring blank in a slot of a spring forming member, the spring forming member having an opening which extends from the slot;

(b) pressing the spring forming member having the spring blank therein within a recess of a housing assembly, the housing assembly having a bore with a mandrel positioned therein that extends through said recess, such that the spring blank in the slot of the spring forming member partially wraps around the mandrel and extends into said opening, to thereby form a shaped spring;

(c) transferring the shaped spring to a magazine;

(d) positioning the shaped spring on a first part of the magazine;

(e) repeating said steps (a)–(d) until a desired number of shaped spring are formed and positioned in a row on the first part of the magazine;

(f) placing an empty shape spring cavity on a second part of the magazine; and (g) pushing one end of the row of shaped springs so as to load one of the shaped springs in the row of shaped springs into the empty shaped spring cavity.

* * * * *